Feb. 10, 1959 M. E. MILLS ET AL 2,872,961
FASTENING DEVICE WITH MEANS FOR SEALING AGAINST BOTH
A THREADED COMPANION FASTENER AND A WORKSURFACE
Filed June 30, 1954

INVENTORS
MALCOLM E. MILLS
CHARLES C. FARONI
BY Richard A. Craig
THEIR ATTORNEY

United States Patent Office 2,872,961
Patented Feb. 10, 1959

2,872,961

FASTENING DEVICE WITH MEANS FOR SEALING AGAINST BOTH A THREADED COMPANION FASTENER AND A WORKSURFACE

Malcolm E. Mills, Glen Rock, and Charles C. Faroni, Morris Plains, N. J., assignors to Elastic Stop Nut Corporation of America, Union, N. J., a corporation of New Jersey Application June 30, 1954, Serial No. 440,514

4 Claims. (Cl. 151—7)

This invention relates to fastening devices and more particularly to a nut having a washer face and means for effecting a seal both along the thread of a companion externally threaded fastener and along the washer face when the washer face is drawn tight against a mating surface by the companion fastener. The device also includes a self-locking feature.

A nut of ½–13 nominal size embodying the invention has withstood pressures up to 6200 pounds per square inch without any leakage whatever. The pressure can be external or internal.

It is therefore an important object of the invention to provide an internally threaded member which when drawn tight against a mating surface by an externally threaded member will produce an effective seal both along the external thread and along the washer face.

It is another object to provide such a nut which is self-locking.

It is a further object to provide such a nut which is of simple, inexpensive construction and which is easily made.

The invention will be described as applied to a nut, but it should be understood that it may be embodied in other forms of internally threaded devices.

The illustrated example of the invention includes a nut member including a threaded body portion and a base portion having a coaxial cylindrical first surface terminating in a washer face and a second surface joining the first surface and the nut thread, these surfaces defining a recess. Held in the recess are a plunger movable toward and away from the second surface and a sealing element having a portion between the plunger and the second surface. Both the plunger and the sealing element extend normally outside the recess, so that when the washer face is drawn against a mating surface by a bolt, for example, both the plunger and the sealing element engage the mating surface before the washer face, to drive the plunger toward the second surface displacing part of the sealing element against the bolt thread in sealing and locking fashion and effecting a seal between the sealing element and the mating surface.

The above and other objects and advantages will become clear from the following description and the accompanying drawings in which.

Figure 4:
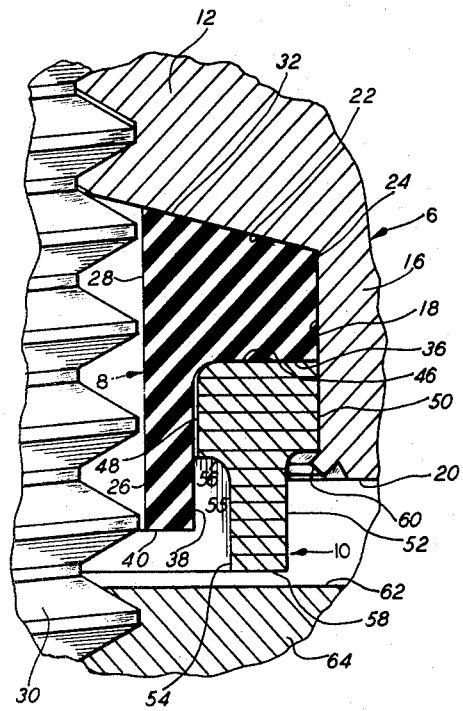
Fig. 4 is a fragmentary view partly in section on larger scale showing a bolt partly advanced through the nut, and a mating surface before any part of the nut has engaged the mating surface.

Reference is now made to the drawing wherein is shown a three-piece nut including a nut member 6, a sealing element 8 and a plunger 10.

Nut member 6, which externally is of the standard hexagonal configuration, has a threaded body portion 12 defining an axis 14 and a base portion 16 having a cylindrical inner surface 18 concentric with axis 14 axially spaced from body portion 12, surface 18 terminating at its end remote from body portion 12 at a washer face 20 perpendicular to axis 14 and extending outwardly from surface 18.

The diameter of surface 18 is preferably substantially greater than that of the thread of nut member 6.

Joining the end of surface 18 remote from washer face 20 and the thread of nut member 6 is a surface 22, which will be arbitrarily considered herein to be part of base portion 16. Surface 22 as shown is frusto-conical and inclined so that it is closer to the plane of washer face 20 at surface 18 than at the thread.

Thus surfaces 18 and 22 define a recess.

Figure 1:
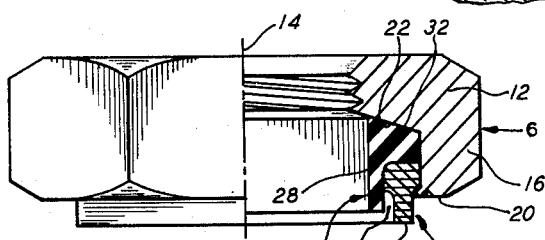
Fig. 1 is an elevation partly in section of a nut embodying the invention.
Figure 3:
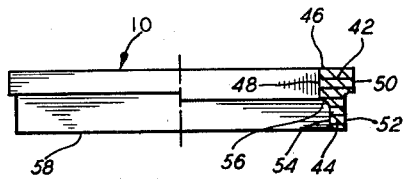
Fig. 3 is an elevation partly in section of the plunger of the nut.
Figure 2:
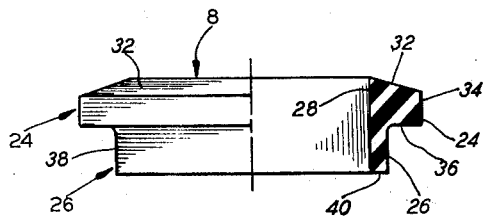
Fig. 2 is an elevation partly in section of the sealing element of the nut.

Sealing element 8 is generally annular and is made of thread impressionable elastic material such as rubber. Sealing element 8 has a top portion 24 and a bottom skirt-like portion 26. Top portion 24 is located entirely in the recess, and when element 8 is unstressed, bottom portion 26 has a part which is outside the recess (Figs. 1 and 4).

Figure 5:
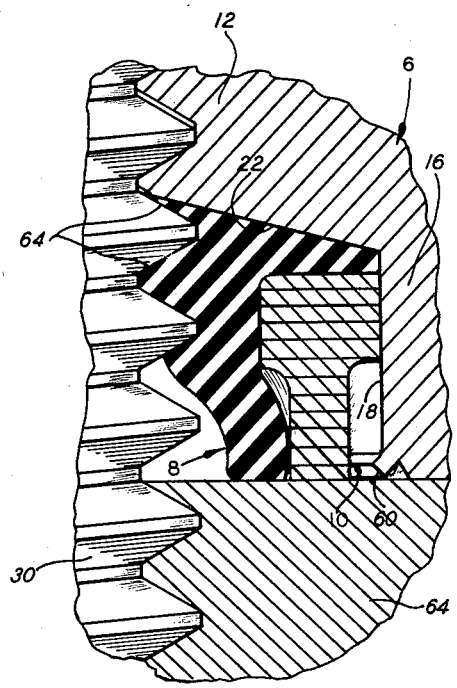
Fig. 5 is a fragmentary view similar to Fig. 4 but with the mating surface engaging the washer face of the nut member.

Portions 24 and 26 have a common inner surface 28 which when element 8 is unstressed is cylindrical and concentric with axis 14 and of diameter slightly greater than the major thread diameter of a companion externally threaded fastener of which a bolt 30 is illustrated in Figs. 4 and 5 by way of example.

Top portion 24 has an upper surface 32 and an outer surface 34 conforming in shape to and engaging surfaces 22 and 18, respectively. Portion 24 further has a bottom surface 36 which is perpendicular to axis 14.

Bottom portion 26 has an outer surface 38 which when element 8 is unstressed is cylindrical and concentric with axis 14 and is of substantially smaller diameter than surface 18. Surface 38 joins surface 36 of top portion 24.

Surfaces 28 and 38 are joined at the bottom by a face 40 which is perpendicular to axis 14 and is normally located below the plane of washer face 20 outside the recess (Figs. 1 and 4).

Plunger 10 is also generally annular and is made of substantially stiffer material than that of sealing element 8. A preferred material for plunger 10 is nylon.

Plunger 10 has a top portion 42 and a bottom skirt-like portion 44. Top portion 42 is located entirely in the recess, and bottom portion 44 has a part which is normally outside the recess (Figs. 1 and 4).

Top portion 42 has a surface 46 perpendicular to axis 14 and conforming to and engaging surface 36 of sealing element 8, a cylindrical inner surface 48 concentric with axis 14 and of diameter adapted for sliding engagement with surface 38 of sealing element 8. Portion 42 further has a cylindrical outer surface 50 concentric with axis 14 and of diameter adapted for sliding engagement with surface 18 of nut member 6.

Bottom portion 44 has an outer cylindrical surface 52 and an inner cylindrical surface 54 concentric with axis 14. The diameter of surface 52 is slightly less than that of surface 50 and that of surface 54 is slightly greater than that of surface 48 with which it is joined by a surface 56 of radius equal to half the difference between the diameters of surfaces 48 and 54, thus leaving an annular cavity 55 between surfaces 38 and 54.

Surfaces 52 and 54 are joined at the bottom by a face 58 which is perpendicular to axis 14 and is normally located below the plane of washer face 20 outside the recess (Figs. 1 and 4).

In the device as shown face 58 is normally further below the plane of washer face 20 than is face 40, although a device with satisfactory characteristics has been made in which the reverse is true.

Top portion 42 of plunger 10 is retained in the recess by means of a deformation of nut member 6 as shown at 60.

The axial distance along surface 18 between surface 22 and deformation 60 is approximately equal to the sum of the axial length of surfaces 50 and 34 when sealing element 8 is unstressed.

The operation of the illustrated device will now be described. Assume that the device is to be turned on bolt 30 to draw washer face 20 against a mating surface 62 of a work element 64. As the device is turned on bolt 30 toward surface 62, face 58 of plunger 10 will contact surface 62 first. Continued turning of the device will cause surface 62 to drive plunger 10 further into the recess, compressing material of sealing element 8 between surfaces 46 and 22, and displacing some material of sealing element 8 inwardly toward axis 14 until the bolt thread is engaged, as at 64 in Fig. 5. Due to the thread impressionable nature of the material of which sealing element 8 is made the material will conform to the bolt thread to provide a seal against fluid flow along the bolt thread and also to provide a self-locking connection between the device and bolt 30.

Continued turning of the device will cause mating surface 62 to engage face 40 at the bottom of sealing member 8, and will also increase the above-described sealing and locking action along the bolt thread by reason of the fact that more material between surfaces 46 and 22 will be displaced toward bolt 30.

Further turning will then cause bottom portion 26 of sealing element 8 to buckle in column-like fashion (Fig. 5) to establish reacting force against mating surface 62 to produce a seal against fluid passage between face 40 of sealing element 8 and mating surface 62. This seal is enhanced due to the fact that until washer face 20 engages mating surface 62 more and more material of sealing element 8 is displaced, and some of the displacement will be in a downward direction toward mating surface 62. This downward displacement will increase the force against mating surface 62.

Fig. 5 illustrates the condition of the parts when sealing internal pressure, that is, when fluid pressure in the volume surrounding the bolt threads at the bottom of the recess exceeds that of the ambient surroundings of the device. In this case buckling of bottom portion 26 of sealing element 8 is directed away from axis 14 into volume 55, until surface 38 bears against surface 54 of plunger 10. The greater the pressure differential the harder will surface 38 bear against surface 54 and mating surface 62 and the greater will be the seal. Thus the seal is self actuating at this point.

When the pressure differential is external, bottom portion 26 of sealing element 8 will buckle inwardly to effect the seal against the bolt threads and mating surface 62.

The precise configuration of surfaces 22 and 36 can be varied within wide limits without departing from the principles of the invention, the essential feature being that as the plunger is driven further into the recess, material of the sealing element be driven against the bolt threads.

Many changes which will occur to those skilled in the art can be made without departing from the principles of the invention. Accordingly the details of the illustrated device are not to be taken as limiting the invention except as such details are included in the appended claims.

We claim:

1. A fastening device comprising a nut member having a threaded portion defining an axis, a cylindrical coaxial first surface of larger diameter than the thread axially separated from said threaded portion, a washer face perpendicular to said axis at the end of said first surface remote from said threaded portion and extending radially outward from said axis, and a frusto-conical second surface joining the threads and the end of said first surface adjacent said threaded portion, a generally annular sealing element of thread impressionable elastic rubber-like material concentric with said axis and having a normally cylindrical inner surface throughout its length having a diamter slightly greater than the major diameter of the thread of said nut member, and having a top portion engaging said first and second surfaces, and a bottom portion a part of which is normally outside said recess, and a generally cylindrical plunger concentric with said axis and having a top portion engaging the under side of the top portion of said sealing element and a bottom portion a part of which is normally outside said recess and which is normally spaced radially outwardly from the bottom portion of said element, said plunger being adapted for movement toward and away from said second surface, so that when said washer face is drawn against a mating surface by a companion externally threaded fastener, said plunger is driven toward said second surface by said mating surface to displace material of said sealing element inwardly to seal and lock with the external thread of said companion fastener and the bottom portion of said sealing element is deformed by said mating surface to effect a seal therewith.

2. A fastening device comprising a nut member having a threaded portion defining an axis, a cylindrical coaxial first surface of larger diameter than the thread and axially spaced from said threaded portion, a washer face perpendicular to said axis at the end of said first surface remote from said threaded portion and extending outwardly from said first surface, and a frusto-conical second surface joining the threads and the end of said first surface adjacent said threaded portion, said first and second surfaces defining a recess, a generally annular plunger having a top portion having a third surface generally facing said second surface, a bottom portion having an inner cylindrical fourth surface concentric with said axis, and an end face perpendicular to said axis and normally outside said recess, said plunger further having a cylindrical fifth surface in sliding relation with said first surface, said plunger being axially slidable in said recess to move said third surface toward and away from said second surface, and a generally cylindrical sealing element of thread impressionable elastic rubber-like material, having a top portion having a part conforming to and engaging said first, second and third surfaces, a bottom portion having an end face perpendicular to said axis and normally less far outside said recess than the end face of said plunger, an inner normally cylindrical sixth surface concentric with said axis and throughout its length having a diameter slightly greater than the major diameter of the thread of said nut member, and said bottom portion of said sealing element having an outer cylindrical seventh surface concentric with said axis and of smaller diameter than said fourth surface, said bottom portion of said plunger thus normally spaced radially outwardly from said bottom portion of said element, such that when said washer face is drawn against a mating surface by a companion externally threaded fastener said plunger will be driven by said mating surface so that material from the top portion of said sealing element will be displaced inwardly against the thread of said companion fastener in locking and sealing fashion and the bottom portion of said sealing element will be deformed by said mating surface to effect a seal therewith.

3. A fastening device comprising a nut member having a threaded portion defining an axis, means providing a recess extending axially from one end of said threaded portion and a washer face at the end of said recess remote from said threaded portion, an axially movable plunger surrounding said axis and having a portion in said recess, and a sealing element of thread impressionable elastic material surrounding said axis and having a first portion axially between said plunger and said threaded portion, and a second portion between said plunger and said axis, said plunger having a top portion adjacent said second portion and a lower portion normally spaced radially outwardly from said element, said sealing element having a normally cylindrical inner surface coaxial with said threaded portion and extending axially from one end of said sealing element to the other and throughout its length having a diameter slightly greater than the major diameter of the thread of said nut member, no part of said fastening device being radially between said inner surface and said axis, said plunger and said sealing element having end faces normally outside said recess.

4. A fastening device comprising a nut member having a threaded portion defining an axis, means providing a recess extending axially from one end of said threaded portion and a washer face at the end of said recess remote from said threaded portion, an axially movable plunger surrounding said axis and having a portion in said recess, and a sealing element of thread impressionable elastic material surrounding said axis and having a first portion axially between said plunger and said threaded portion, and a second portion between said plunger and said axis, said plunger having a top portion adjacent said second portion and a lower portion normally spaced radially outwardly from said element, said sealing element having a normally cylindrical inner surface coaxial with said threaded portion and extending axially from one end of said sealing element to the other and throughout its length having a diameter slightly greater than the major diameter of the thread of said nut member, no part of said fastening device being radially between said inner surface and said axis, and said plunger and said sealing element having end faces normally outside said recess, said end face of said plunger being perpendicular to said axis.

References Cited in the file of this patent
UNITED STATES PATENTS

| | | |
|---|---|---|
| 154,851 | Dittman | Sept. 8, 1874 |
| 1,604,298 | Neitzel | Oct. 26, 1926 |
| 2,373,253 | Martin | Apr. 10, 1945 |
| 2,396,005 | Gross | Mar. 5, 1946 |

FOREIGN PATENTS

| | | |
|---|---|---|
| 8,026 | Great Britain | Apr. 3, 1912 |